Feb. 21, 1967    J. P. REED    3,304,966
AUTOMATIC MULTI-CHANNEL REAGENT DISPENSER
Filed Jan. 11, 1965    2 Sheets-Sheet 1

INVENTOR
JACK P. REED
BY
Ernest J. Cohen
Gersten Sadowsky
ATTORNEYS

INVENTOR
JACK P. REED

BY Ernest S. Cohen
Gersten Sadowsky
ATTORNEYS

United States Patent Office

3,304,966
Patented Feb. 21, 1967

3,304,966
AUTOMATIC MULTI-CHANNEL REAGENT
DISPENSER
Jack P. Reed, 21 Glendale Drive,
Little Rock, Ark. 72204
Filed Jan. 11, 1965, Ser. No. 424,866
5 Claims. (Cl. 141—359)

The invention herein described and claimed may be manufactured and used by or for the Government of the United States of America for governmental purposes without the payment of royalties thereon or therefor.

This invention relates generally to means for dispensing measured amounts of fluid material, and more particularly to apparatus for automatically dispensing exact predetermined quantities of such materials in cyclic operations of the apparatus.

Th preparation of test samples, such as of minerals, biological specimens, etc., for aliquots for spectrophotometric, and other determinations, frequently involves the utilization of precise quantities of conditioning substances, such as reagents. Routine processing or "prepping" of large numbers of such test samples by hand operated means now widely used, is normally time consuming, and becomes physically and mentally demanding. Application of the present invention to procedures of this sort drastically reduces the time spent therefor, and minimizes possible human errors in such work since no appreciable visual or mental effort is required on the part of the person operating the invention.

It is an object of the present invention to provide an apparatus to facilitate and simplify analytical and clinical techniques requiring the dispensing of specified differential increments of fluid materials.

A further object is to provide an automatic apparatus having separately regulatable channeling means for concurrently dispensing precise amounts of fluid materials.

Figure 1:
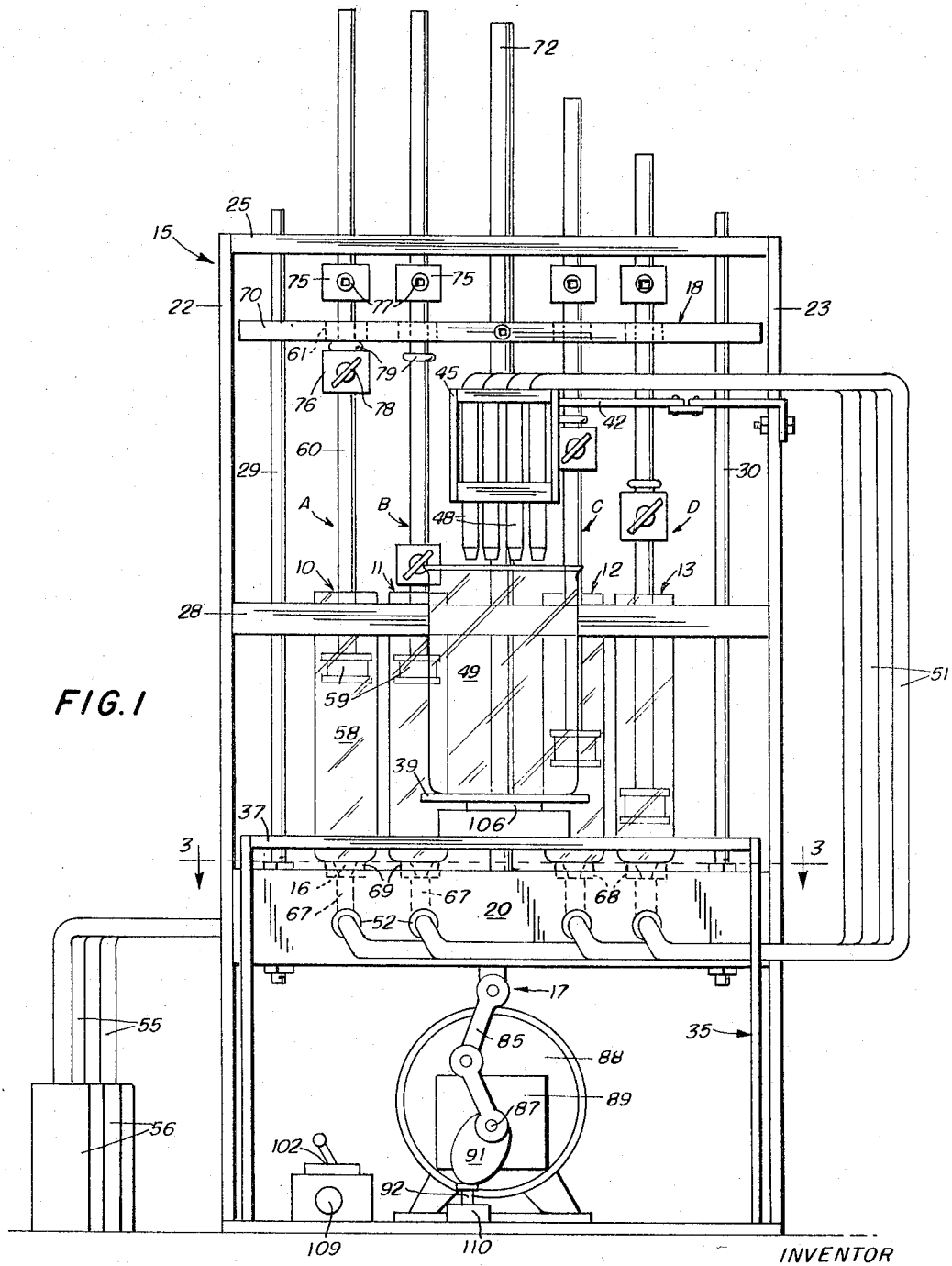
Figure 2:
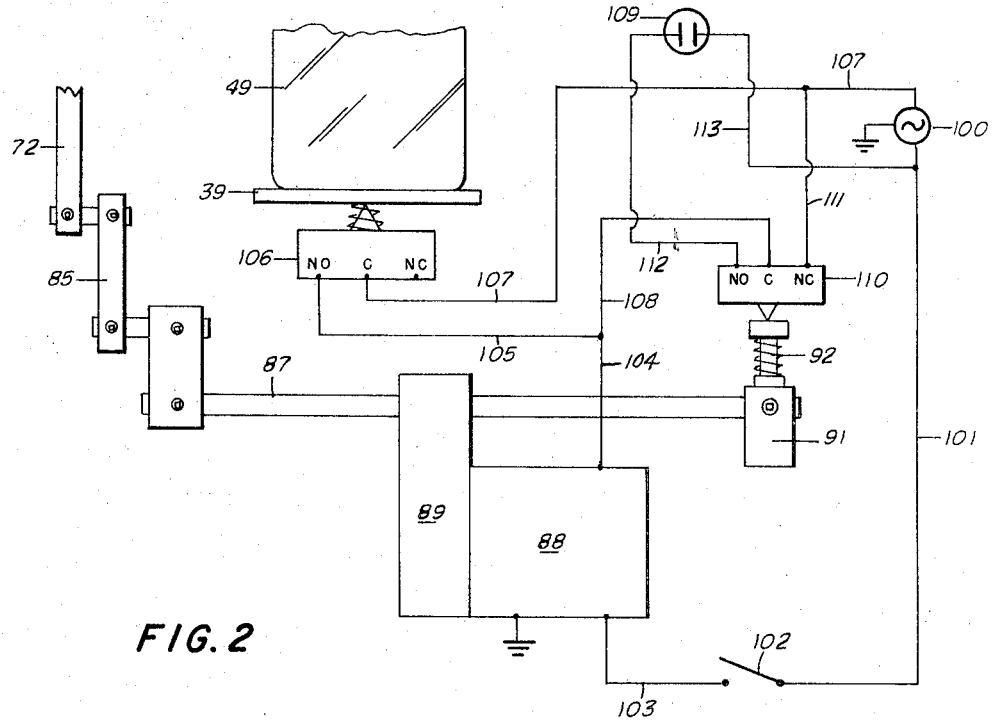
Figure 3:
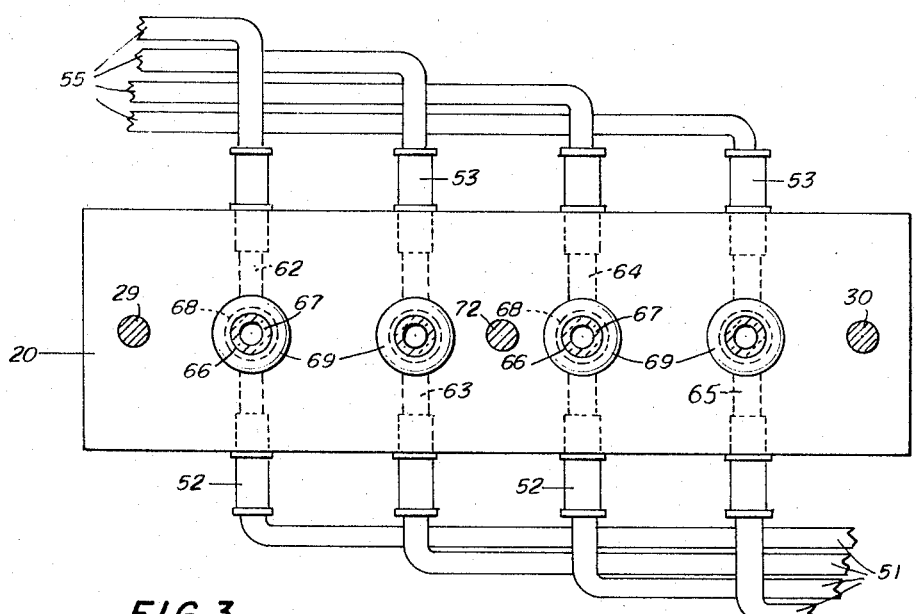

Other objects will appear from the following description of a preferred embodiment of the invention, reference being had to the accompanying drawing in which FIG. 1 is an elevational view of the apparatus according to the invention in an approximately primed condition for a dispensing operation;

FIG. 2 is a schematic wiring diagram including a showing of electrical switching devices and their actuators, employed to control cyclic operations of the apparatus of FIG. 1; and FIG. 3 is a cross-sectional plan view along line 3—3 in FIG. 1.

In the form of the invention shown in FIG. 1, four syringe-like metering devices 10 to 13 constitute measuring and pumping expedients whose operations are controlled to dispense predetermined quantities of fluid. A rectangular frame structure 15, disposed in an upright position, provides an open housing in which metering devices 10 to 13 are vertically arrayed with their discharge ends 16 directed downward. Metering devices 10 to 13 are caused to function by a cyclically operable drive mechanism 17, and a plurality of lost-motion connections 18, arranged respectively in the lower and upper portions of frame structure 15, below and above the devices. Immediately below metering devices 10 to 13 is a valve chamber block, or manifold 20, into which are fitted discharge ends 16 of the devices.

Frame 15 is an assembly including a pair of side plates 22 and 23, to which are joined a top plate 25, a base plate 26, and an intermediate plate 28, parallel to the latter. Manifold 20 is fastened by screws, or the like, to side plates 22 and 23, whereby it is suitably spaced between plates 26 and 28, and parallel thereto, to properly accommodate in frame 15 metering devices 10 to 13 and cyclic drive mechanism 17, as hereinbefore indicated. Frame 15 gains added rigidity from a pair of rods 29 and 30, traversing holes extending through end portions of manifold 20, and secured thereto by nuts engaging threaded portions of the rods. These rods reach upwardly from the manifold and pass through aligned openings in plates 25 and 28.

Fixed to base plate 26, and rising in front of frame 15, is a further assembly of plates constituting a stand 35, whose top surface 37 is located just above manifold 20. Centrally positioned on surface 37 is a circular stage 39. An articulated arm 42, having one end fixed to frame side plate 23, supports on an extended link thereof a cage-like multiple clamp structure 45. A set of tubular nozzles 48 are held within clamp 45 so as to situate their discharge ends directly over stage 39, at a sufficient height above the stage to allow a flask 49, or other similar container, to be placed therebetween. Flexible tubings constituting conduits 51, respectively connect a separate one of the inlet ends of nozzles 48 to individual valve units 52, shown in FIGS. 1 and 2, passing into the side wall of manifold 20. Similar valve units 53, shown in FIG. 3 projecting out of the other side of the manifold, are individually connected by further flexible tube conduits 55, to respective ones of a group of containers 56 storing the fluids destined to be dispensed by operation of the invention.

The embodiment of the invention described herein makes available four dispensing channels A, B, C, and D. As is evident from FIG. 1, the respective channels have substantially the same structural form. Referring to channel A, by way of disclosure for all four channels, its metering device 10 is seen to comprise a barrel part 58, constituting a calibrated reservoir, and a piston whose head 59 is displaceable in barrel part 58 by an elongated piston rod 60, within a span which determines the quantity of fluid coursed through the metering device in each operational cycle of drive mechanism 17. Frame 15 supports the four metering devices in a spaced-apart, vertical alignment by means of axially oriented, appropriately sized holes traversing its top plate 25, and intermediate plate 28, through which are received the devices' piston rods 60, and barrel parts 59, respectively. With particular reference to FIGS. 1 and 3, manifold 20 is seen as interconnecting respective sets of valve units 52 and 53, and the discharge ends 16 of the devices operatively associated therewith, within four separate ducts or flow-through passages 62, 63, 64 and 65 in the manifold block. Top surface apertures 66, shown leading into the manifold's horizontal passages, can be drilled and tapped to take suitably threaded Luer fitting 67, normally used on the discharge ends of syringe devices. Recesses 68 in the upper parts of apertures 66 are provided so that O rings 69 placed thereon will be forced down when the barrel parts are properly fastened. The apertures provided in the opposite sides of manifold 20 for the valve units, can be similarly drilled, tapped, and recessed to take threaded extensions of the valve bodies, and O ring seals. As will be hereinafter more fully explained, valve units 53 and 52, are unidirectional check valves that are arranged in the block of manifold 20 to allow fluid flow into and out of the block, respectively, via passages 62 to 65.

Force applied to displace the pistons in metering devices 10 to 13, is transmitted through the action of a driver plate 70 which functions to operatively link lost-motion connections 18 to cyclically operable drive mechanism 17. As best seen in FIG. 1, a driver plate 70 is arranged in frame 15 parallel to the horizontally aligned plates thereof, and fixed securely by set screws, or the like, to a driver slide rod 72, projecting through an opening in the plate. Slide rod 72 is adapted to fit smoothly within axially aligned holes centrally located in frame plates 25 and 28, and manifold 20, and be constrained therein to straight-line vertical displacement. Other openings through plate 70, near its opposite ends, provide passages for frame rods 29 and 30, on which the plate is freely displaceable in a guided vertical path. Four relatively larger openings 61, spaced across plate 70, are each axially aligned with a respective one of piston rods 60, passing therethrough. Comprising the lost motion connections 18 are two sets of regulator collars 75 and 76, which are adjustably attached in pairs to each of the four piston rods of the metering devices, above and below driver plate 70. The collars have substantial thickness whereby they are diametrically wider than driver plate openings 61, situated between these collars. Provisions to fasten the collars to the piston rods include set screws 77 in upper set 75, and thumb screws 78 in lower set 76. Encircling each piston rod between the collars thereon is an elastic O ring 79. These rings are of lesser diameter than a driver plate opening 61, such that the plate is movable thereover whereby the rings are adapted to function as regulator stops in a manner hereinafter more fully explained.

Comprising the cyclically operable drive mechanism 17, is a conventional slider crank linkage 85 connecting slide rod driver 72 to a drive shaft 87. An electric motor 88 is provided to rotate drive shaft 87 through a reducing gear train in a gear box 89 attached to the motor casing. Drive shaft 87 additionally positions a switch controlling cam 91, keyed to the shaft in the usual manner. Turning to the schematic showing in FIG. 2, it will be seen that an energizing circuit can be completed from a power source 100 to motor 88 through two circuit paths; a first including lead 101, manually operated start switch 102, leads 103, 104 and 105, normally open contacts of trigger switch 106, and lead 107, and a second including lead 101, switch 102, leads 103, 104, and 108, normally closed contacts of a microswitch 110, leads 111 and 107. An energizing circuit for a cycle start indicator light 109 is also provided, and it is completed through lead 107, normally open contacts of switch 106, leads 105, 108, normally open contacts of switch 110, and leads 112 and 113.

Trigger switch 106 is located on stand 35, fixed to its surface 37 beneath stage 39. A light spring holds stage 39 above an actuator projection of switch 106 until the weight of a flask 49 placed on the stage depresses the actuator to momentarily complete an electrical connection at the normally open contacts of switch 106. With start switch 102 closed, the first circuit path for energizing motor 88 is thereby completed, and remains effective to energize motor 88 for a time that is sufficient to allow the controlling rise of cam 91 to separate from a spring loaded switch depressor 92 acting on an actuator projection of switch 110. Thus, shortly after switch 106 is triggered, switch 110 is caused to open its normally open contacts and close its normally closed contacts whereby the second circuit path for energizing motor 88 is completed, and continues effective when trigger switch 106 reverts to normally open condition. In this manner a complete rotation of crank linkage 85 is attained before the rise of cam 91 again bears upon depressor 92 to actuate switch 110. In the operation of switch 110 which follows, the normally closed contacts thereof are opened and its normally open contacts are closed whereby the second circuit path energizing motor 88 is thus also disabled. Since the normally open contacts of switch 110 are maintained closed at the end of a cycle, the start of a subsequent cycle in response to the disposition of a flask on stage 39, and actuation of switch 106, finds light 109 on in its energizing circuit through the two switches.

Prior to using the present invention in routine applications it must be primed and calibrated. Accordingly, the suction ends of tubular conduits 55 are initially placed in distilled water, and driver plate 70 is manually moved to its upper or cocked position where it is held by inertia and friction normally present in the assembled parts. An aspirator hose is touched briefly to each of the discharge nozzles 48 to pull water through all fluid passages in the channels. All regulator collars 75 and 76 are then released to slide freely on the piston rods, and the piston rods are hand operated to pump water through the barrels of metering devices 10 to 13 until all air bubbles are gone. Thereafter, all piston parts are displaced to their lower positions preparatory to calibrating the individual channels.

After the channel A flow-through connections between conduit 55 and fluid supply container 56 are reestablished, calibration of this channel is begun with driver plate 70 remaining in an extreme upper, or cocked position. Metering device 10 can therefor be set by manually drawing its piston rod 60 upwardly until piston head 59 reaches that point along the length of barrel 58 at which the desired quantity of fluid would be dispensed from channel A in a cycle of operation. Thereafter, upper regulator collar 75 is brought into contact with the top of driver plate 70, and fixed to piston rod 60 by tightening set screw 77. With O ring regulator stop 79 pushed up out of the way, lower regulator collar 76 of channel A is moved up on piston rod 60 so as to underestimate its likely span of travel, and locked in place by thumb screw 78. The apparatus is thereafter electrically triggered to dispense fluid through channel A, wherein the amount delivered is short of the desired volume. Regulator collar 76 is subsequently readjusted upwardly in the course of several cycles until piston head 59 reaches the bottom of barrel 58 in each cycle, whereupon the O ring regulator stop 79 is forced down to contact the regulator collar after it is locked in place. Regulator collar 76 in channel A is once more unlocked and the calibrations of channels B, C, and D, are then separately managed in the same way as that previously described for channel A. Thereafter, the calibration of channels A to D is completed by again bringing the lower regulator collars 76 into contact with regulator stops 79, now marking the positions on the piston rods heretofore determined, so that the collars can be fixed thereat by tightening their thumb screws. However, any channel can be thereafter changed to deliver either zero or any calibrated volume. A zero volume is effected in a channel simply by loosening the lower regulator collar thereof and permitting it to come to rest on the upper shoulder of the barrel part of the related metering device. Maximum calibrated volume is obtained by merely sliding the lower regulator collar upwardly on the piston rod associated therewith, and tightening its thumb screw when the collar impinges on the previously positioned regulator stop. Triggering a cycle of operation would then effect a delivery of the volume for which the regulator stop was set.

In a preferred construction of the disclosed invention all upper and lower regulator collars have clearance from the top plate 25, and intermediate plate 28, respectively, to avoid forcing the parts due to mismeasurements in making settings thereof in respect to driver plate 70, and the resultant pushing on the tightened collars either up or down. Materials for the construction are selected as required by the nature of the fluids dispensed. For example, reagent substances can be safely carried in metering devices 10 to 13, manifold block 20, and tubings 51 and 55, made from polypropylene, polystyrene, polyethylene, lucite or Teflon. The general enclosure and support structure, and the power train elements would in this instance be fabricated from aluminum, or other corrosion resistant stock.

While a preferred embodiment of the invention has been illustrated and described, it is understood that the invention is not limited thereby but is susceptible to change in form and detail.

What is claimed is:

1. A fluid dispensing apparatus comprising a plurality of measuring and pumping devices, each said device including a metering reservoir having a tubular discharge element at one end thereof, and a piston cyclically displaceable therein to and from said one end, a manifold having a corresponding plurality of separate fluid flow passages, each passage defining three apertures in said manifold, a first of said apertures in each said passage having secured therein one of said discharge elements, a second of said apertures in each passage having secured therein a unidirectional valve operative to allow fluid flow into said passage, and said third of said apertures in each passage having secured therein a further unidirectional valve operative to allow fluid flow out of said passage, corresponding pluralities of fluid storage containers and discharge nozzles, separate conduit connections between respective ones of said in-flow valves and individual ones of said fluid storage containers, and further separate conduit connections between respective ones of said outflow valves and individual ones of said discharge nozzles, a cyclic drive means, displacement regulating means adjustably secured to each of said pistons, a drive connector means operatively linking said cyclic drive means to said displacement regulating means to cyclically displace said pistons regulated distances, each said piston includes a piston head enclosed by said metering reservoir thereof and having integral therewith a piston rod projecting beyond said reservoir, said displacement regulating means including a multiplicity of parts fastened to said piston rods, and said drive connector means comprising a unitary element attached to said cyclic drive means and spanning about said piston rods so as to dwell between said multiplicity of parts of said displacement regulating means whereat said unitary element acts on said parts to control said pistons to pump fluid into and out of said flow passages and through said conduit connections whereby predetermined quantities of fluid received from said storage containers are concurrently dispensed through said discharge nozzles.

2. A fluid dispensing apparatus for introducing fluid into a receptacle comprising a plurality of measuring and pumping devices, cyclically operable drive means, and further means interconnecting said drive means to said devices for effecting measuring and pumping functions therein, said further means including a plurality of groups of variously settable control elements which are cyclically displaceable concurrently by said drive means, each said plurality of devices having operatively associated therewith a corresponding one of said groups to determine the quantity of fluid dispensed by each of said devices in every operation thereof by said drive means, fluid storage containers, fluid discharge elements, a receptacle arranged in said apparatus to receive the outputs from said discharge elements, two sets of fluid carrying conduits, a manifold component in which ducts provide flow passages between openings therein for fluid pumped therethrough, one of said openings in each of said ducts having secured therein one of said plurality of devices, another of said openings in each of said ducts having secured therein a conduit of one of said sets of conduits connecting it to one of said storage containers, and a still further opening in each of said ducts having secured therein a conduit of the other of said sets of conduits connecting it to one of said fluid discharge elements, and wherein said drive means include automatic control means initiating and terminating each cycle of operation.

3. The fluid dispensing apparatus of claim 1 wherein said multiplicity of parts of said displacement regulating means includes two sets of collars, each of said piston rods having slidably mounted thereon one of each set of said collar elements, and fastening means in each said collar being operable to secure its collar to a piston rod at a preselected position thereon, whereby said unitary element of said drive connector means dwells between said collars secured to each piston rod and effectuates a lost-motion connection therewith.

4. The fluid dispensing apparatus of claim 3 wherein each piston rod slidably supports one of said collars thereon above and another of said collars thereon below said unitary element of said drive connector means, and a compressible stop ring force fitted thereon.

5. The fluid dispensing apparatus of claim 2 wherein said automatic control means of said cyclically operable drive means comprises an electric motor, gear means connecting the drive of said motor to a main drive shaft, cycle defining transmission elements connecting said main drive shaft to said further means interconnecting said drive means to said devices, independently effective energizing circuits for operating said motor including a common source of power, a trigger switch operable when actuated to momentarily close contacts therein, a further switch operable when actuated to close open contacts therein and open normally closed contacts therein, a cam fixed to said main drive shaft being disposed in respect to said further switch at the start and end of a cycle of operation of said apparatus to actuate said further switch, a support member for said receptacle, said member being operable when supporting said receptacle to actuate said trigger switch whereby said motor is started and said main drive shaft moves said cam to release said further switch to close its normally closed contacts and complete said another motor energizing circuit which continues operation of said motor until said cam is again disposed to actuate said further switch to open said normally closed contacts thereof in said another motor energizing circuit and deactivate said motor.

References Cited by the Examiner
UNITED STATES PATENTS 3,149,753   9/1964   Forsyth _____ 222—309 X
3,205,920   9/1965   Cozzoli et al. _____ 141—258 X LAVERNE D. GEIGER, *Primary Examiner.*

SAMUEL ROTHBERG, H. S. BELL,
*Assistant Examiners.*